(12) United States Patent
Shenouda

(10) Patent No.: US 11,569,718 B2
(45) Date of Patent: Jan. 31, 2023

(54) MULTI-ROTOR ELECTRIC MACHINE

(71) Applicant: PRATT & WHITNEY CANADA CORP., Longueuil (CA)

(72) Inventor: Antwan Shenouda, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 75 days.

(21) Appl. No.: 17/325,845

(22) Filed: May 20, 2021

(65) Prior Publication Data

US 2021/0273539 A1    Sep. 2, 2021

Related U.S. Application Data

(63) Continuation of application No. 16/186,730, filed on Nov. 12, 2018, now Pat. No. 11,073,884.

(60) Provisional application No. 62/723,515, filed on Aug. 28, 2018.

(51) Int. Cl.
    *H02K 7/116* (2006.01)
    *H02K 16/02* (2006.01)
    *F16H 1/22* (2006.01)

(52) U.S. Cl.
    CPC .............. *H02K 16/02* (2013.01); *F16H 1/227* (2013.01); *H02K 7/116* (2013.01)

(58) Field of Classification Search
    CPC ....... H02K 7/116; H02K 16/005; H02K 16/02
    See application file for complete search history.

(56) References Cited

U.S. PATENT DOCUMENTS

| 1,785,965 A | 12/1930 | Major |
| 5,258,677 A | 11/1993 | Mason |
| 5,760,503 A | 6/1998 | Tsuchida et al. |
| 8,232,700 B2 | 7/2012 | Dooley |
| 8,666,579 B2 | 3/2014 | Akutsu et al. |

FOREIGN PATENT DOCUMENTS

WO    201416908 A2    10/2014

OTHER PUBLICATIONS

European Patent Office, Communication re: extended European search report for European patent application No. 19194198.8, dated Nov. 12, 2019.
English translation of International Patent Document No. WO 2014169308 dated Oct. 23, 2014, https://patents.google.com/patent/WO2014169308A2/en?oq=WO2014169308A2, accessed on Feb. 11, 2020.

*Primary Examiner* — Ramon M Barrera
(74) *Attorney, Agent, or Firm* — Norton Rose Fulbright Canada LLP

(57) ABSTRACT

A multi-rotor electric machine having a stator, a first rotor magnetically coupled to the stator and a second rotor magnetically coupled to the stator is disclosed. A method of operating the electric machine comprises driving a gear via a first face of the gear using the first rotor and driving the gear via a second face of the gear using the second rotor.

14 Claims, 7 Drawing Sheets

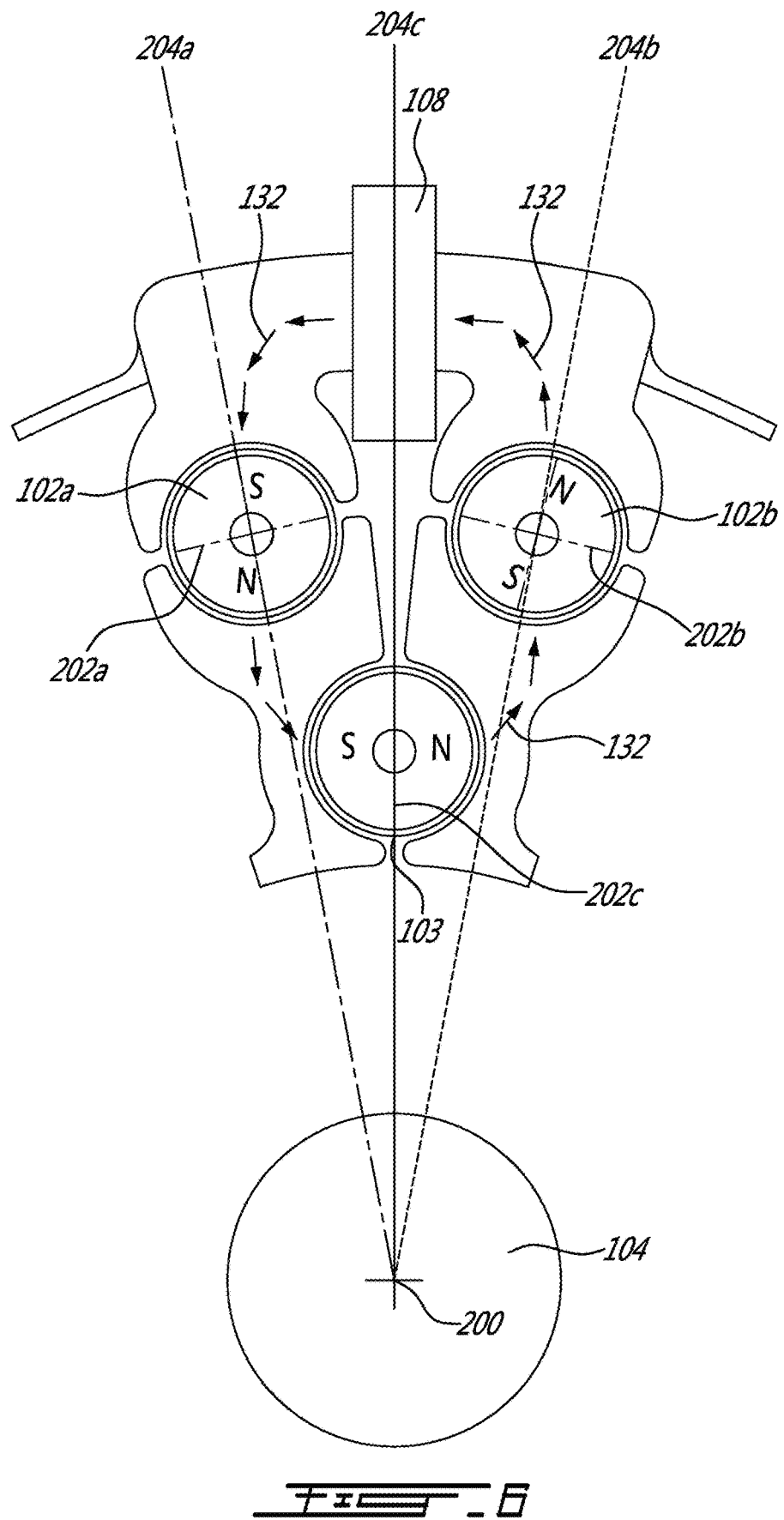

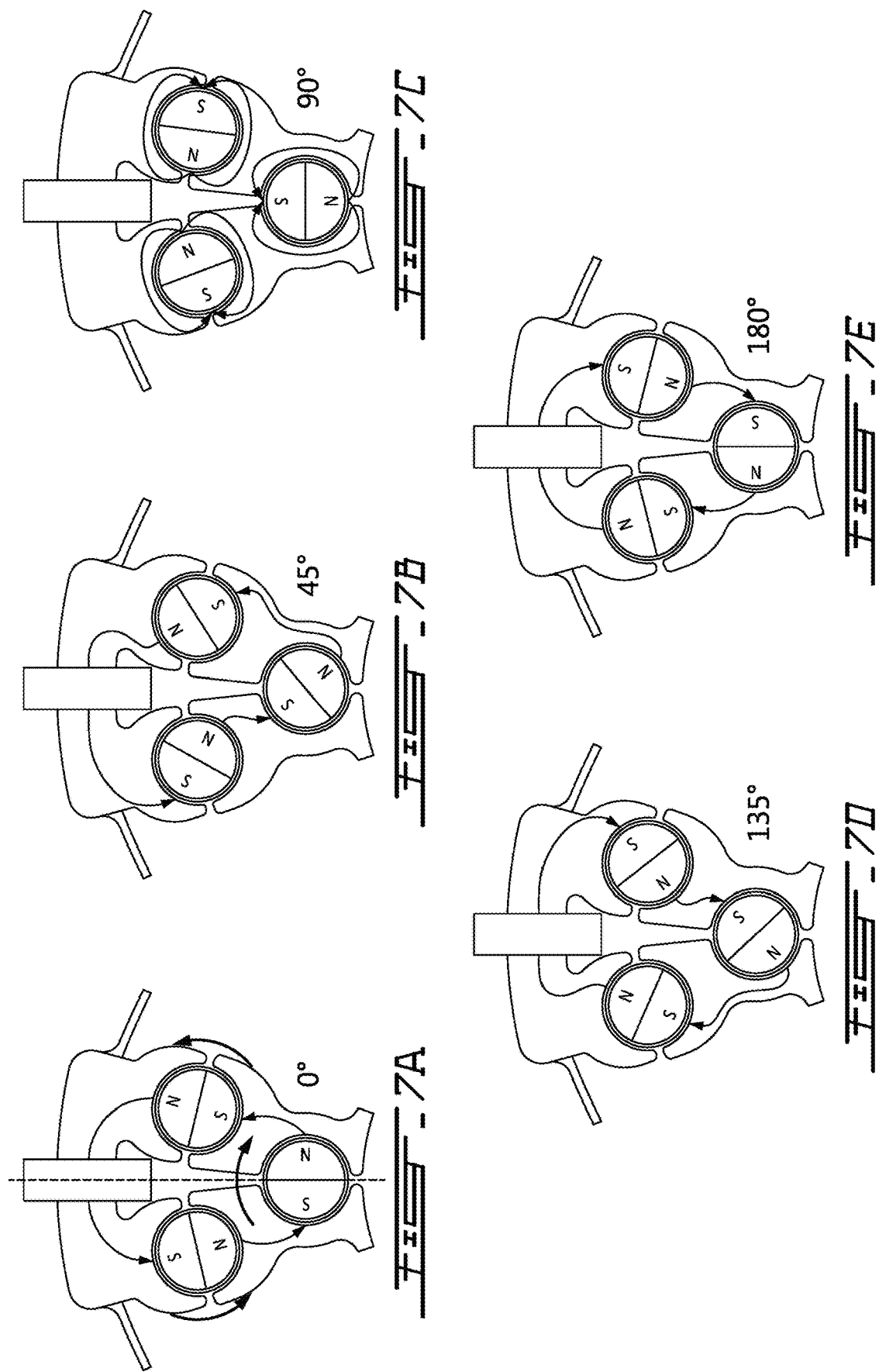

US 11,569,718 B2

MULTI-ROTOR ELECTRIC MACHINE

CROSS REFERENCE TO RELATED APPLICATIONS

This application is a continuation of U.S. patent application Ser. No. 16/186,730 filed on Nov. 12, 2018 and incorporated herein by reference, which claims priority from U.S. Provisional Patent Application No. 62/723,515 filed on Aug. 28, 2018, the entire contents of which are hereby incorporated by reference.

FIELD

This relates generally to electric machines, and more particularly to multiple-rotor electric machines such as motors and generators.

BACKGROUND

Electric machines with multiple rotors are known and may provide enhanced power over conventional electric machines. However, multiple-rotor electric machines may be heavier and less powerful than necessary or desirable, and may not be as efficient as desirable.

Accordingly, there is a need for lighter and more powerful electric machines which make more efficient use of materials.

SUMMARY

According to an aspect, there is provided a multi-rotor electric machine comprising: a stator; a first rotor magnetically coupled to the stator and rotatably mounted relative to the stator; a second rotor magnetically coupled to the stator and rotatably mounted relative to the stator; and a gear drivingly coupled to both the first and second rotors, the first rotor being drivingly coupled to a first face of the gear and the second rotor being drivingly coupled to a second face of the gear.

According to another aspect, there is provided an electric machine comprising: a plurality of stators circumferentially distributed about a central axis of the electric machine; a plurality of rotors arranged in triplets, each triplet of rotors sharing a common magnetic circuit with a respective one of the stators, each triplet of rotors comprising an adjacent pair of radially-outer rotors and a radially-inner rotor relative to the central axis; and a common gear rotatable about the central axis and drivingly coupled to the plurality of magnetic rotors, the radially-outer rotors being drivingly coupled to a radially-outer face of the common gear and the radially-inner rotors being drivingly coupled to a radially-inner face of the common gear.

According to another aspect, there is provided a method of operating an electric machine having a stator, a first rotor magnetically coupled to the stator and a second rotor magnetically coupled to the stator, the method comprising: driving a gear via a first face of the gear using the first rotor; and while the gear is driven using the first rotor, driving the gear via a second face of the gear using the second rotor.

Other features will become apparent from the drawings in conjunction with the following description.

BRIEF DESCRIPTION OF DRAWINGS

In the figures which illustrate example embodiments,

FIG. 6 is a schematic front partial cut-away view of a portion of an electric machine showing rotor orientations in accordance with an embodiment; and FIGS. 7A to 7E are schematic front partial cut-away views of the portion of the electric machine depicted in FIG. 6 throughout a half-cycle of operation.

DETAILED DESCRIPTION

Various aspects of preferred embodiments of electric machines according to the disclosure are described herein with reference to the drawings.

Electric machines may have more than one rotor. An example of a multi-rotor electric machine is provided in U.S. Pat. No. 8,232,700 B2, the contents of which are incorporated by reference in their entirety.

Figure 1:
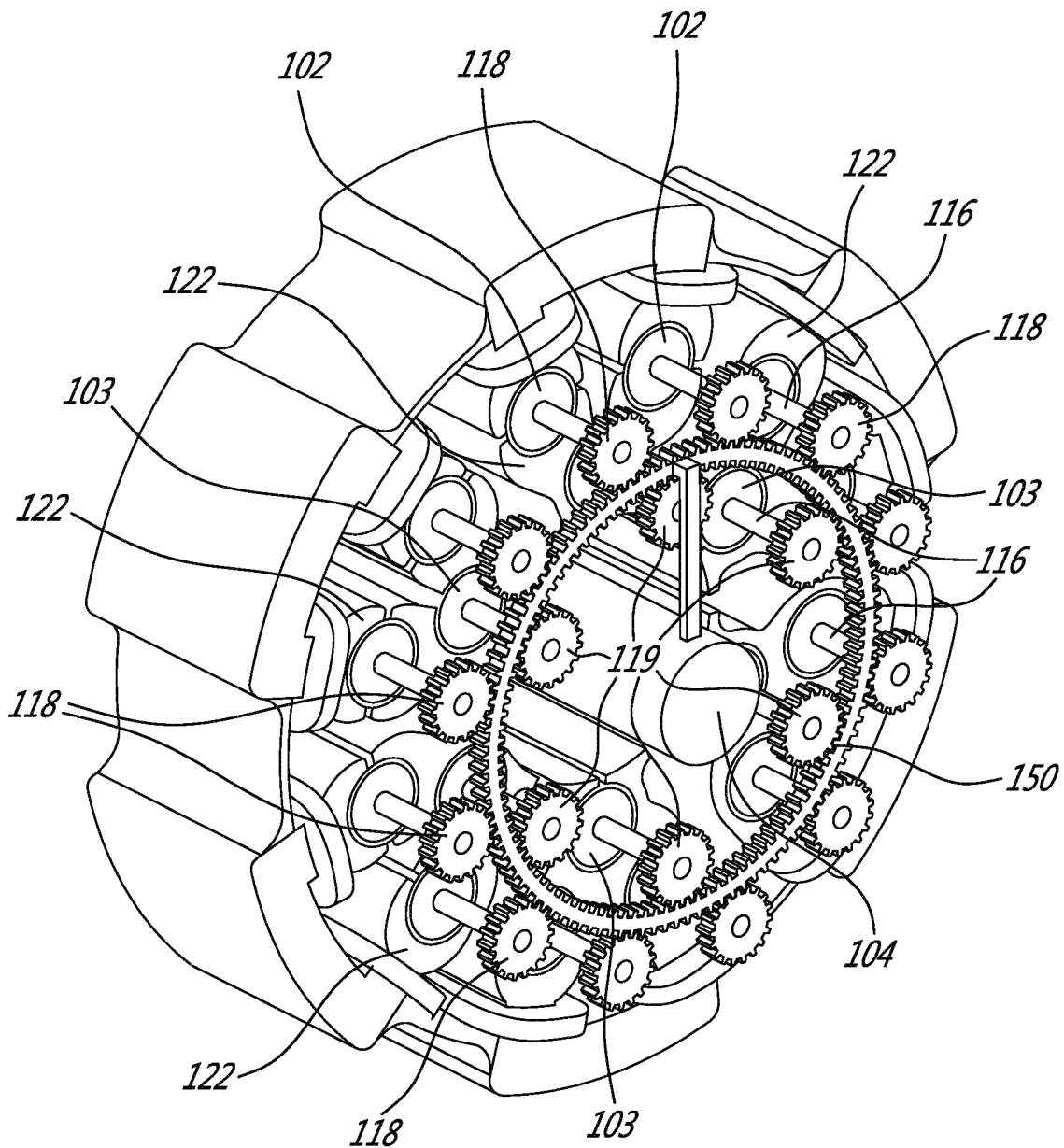
FIG. 1 is a schematic perspective view of portions of an embodiment of a multi-rotor electric machine.

FIG. 1 is a schematic perspective view of an embodiment of an electric machine. As depicted, electric machine 100 includes central shaft 104 connected to common main gear 150. For example, central shaft 104 may be drivingly coupled to main gear 150 via one or more radially-extending arms or a circumferentially-continuous surface. FIG. 1 shows a single radially-extending arm for clarity to provide visibility to internal components of electric machine 100.

Main gear 150 engages with multiple (e.g., pinion) gears 118, 119 arranged so as to be in meshing engagement with teeth on an outer face of main (e.g., ring) gear 150 and an inner face of main gear 150. Each gear 118, 119 is connected to a respective rotors 102, 103 via a rotor shaft 116. One or more windings 108 (see FIG. 2) are wrapped around stator 122 to induce a magnetic field (when current is applied to winding(s) 108) or to have a magnetic field induced therein (when main gear 150 rotates, thereby causing rotors 102, 103 and consequently gears 118, 119 to rotate).

Figure 2:
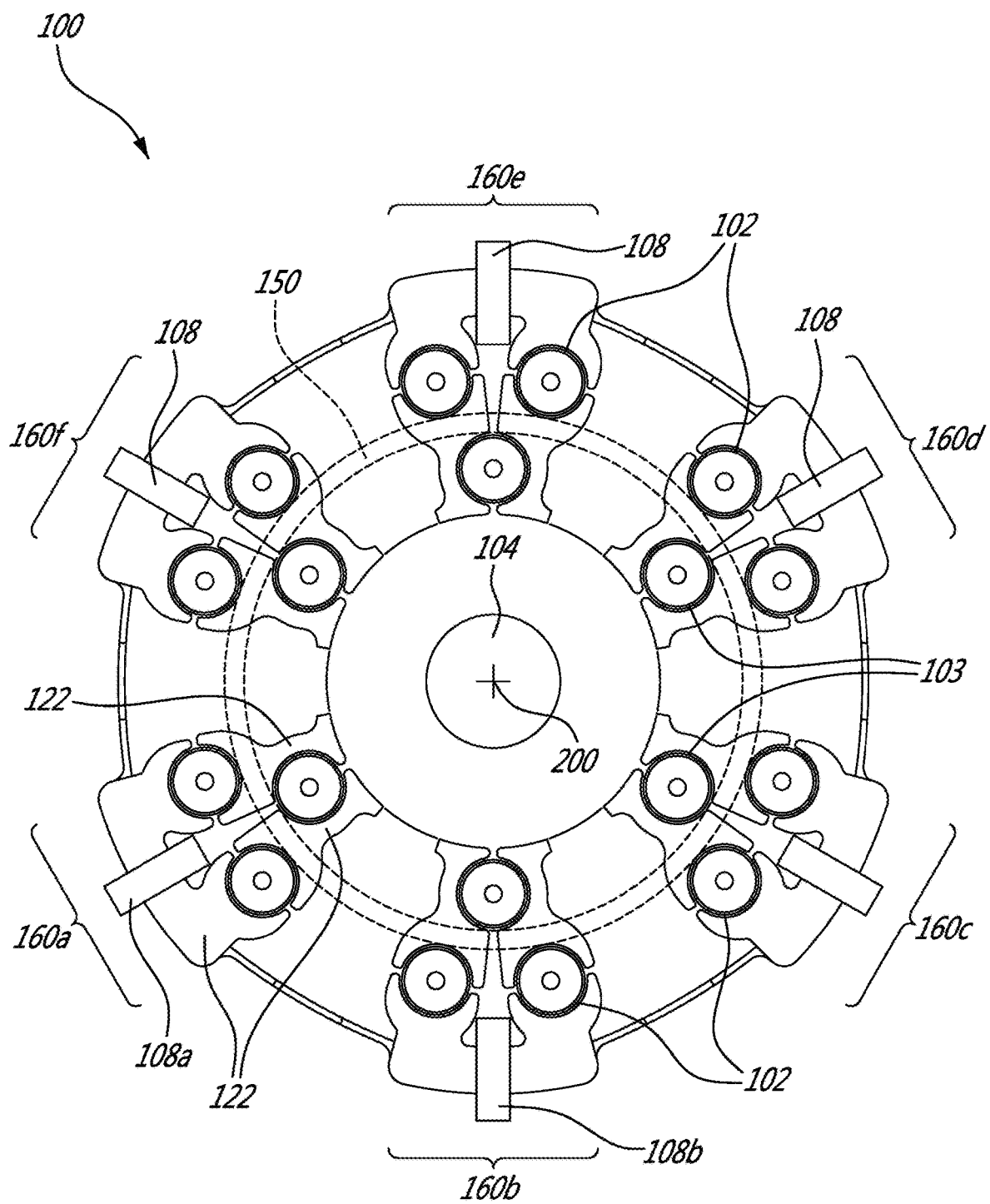
FIG. 2 is a schematic front cut-away view of portions of the electric machine of FIG. 1.
Figure 3:
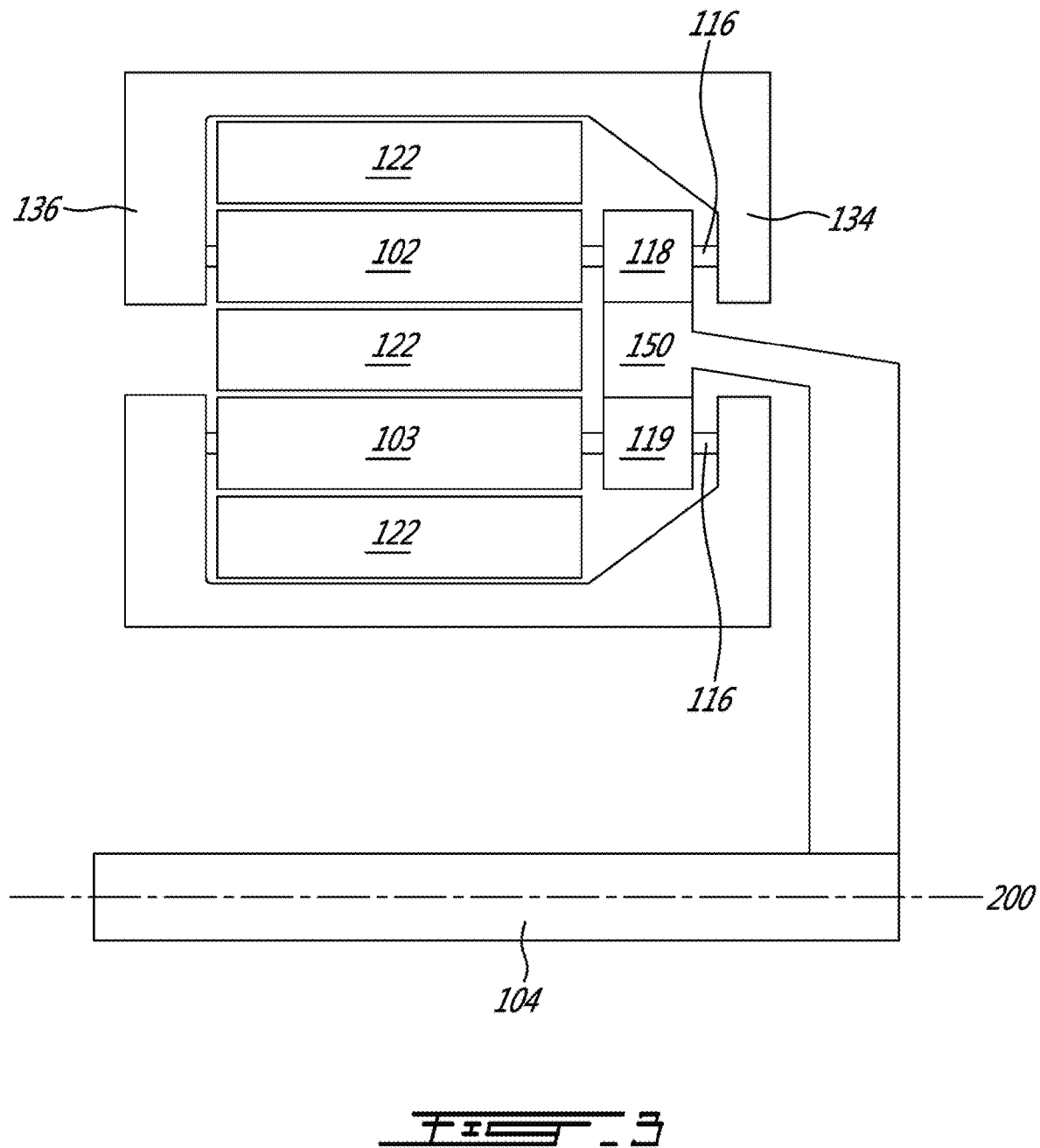
FIG. 3 is a schematic side view of a cross-section of a portion of an embodiment of a multi-rotor electric machine.

FIG. 2 is a schematic front view of the example electric machine depicted in FIG. 1. As illustrated, machine 100 comprises a plurality of outer magnetic rotors 102, a plurality of inner magnetic rotors 103, windings 108, stators 122, main gear 150, and shaft 104. As depicted in FIGS. 2 and 3, machine 100 includes a plurality of outer magnetic rotors 102, each configured to rotate with a separate rotor shaft 116, and a plurality of inner magnetic rotors 103, each configured to rotate with a separate rotor shaft 116. In some embodiments, the number of inner rotors 103 may be half the number of outer rotors 102 in machine 100.

As depicted in FIGS. 2 and 3, each rotor shaft 116 is configured to drive shaft 104 by means of outer (e.g., pinion) gears 118 and inner (e.g., pinion) gears 119 interacting with central main (e.g., ring) gear 150. The rotor shafts 116 are caused to rotate by respective magnetic rotors 102, 103. In some embodiments, the machine 100 is operable as a motor and current is applied to windings 108 to cause the gears 118, 119 to drive the main gear 150. In some embodiments, the machine 100 is operable as a generator so that when a torque is applied to shaft 104, main gear 150 causes rotors 102, 103 to rotate via gears 118, 119 and thus causes a flow of electrical current in windings 108.

Please note that in some figures, gears are shown without teeth for the sake of clarity. As described herein, gears may be provided in any suitable form, including in the form of toothless wheels engaged by friction, as well as gears with teeth which engage with other gears.

FIG. 3 is a schematic side view of a cross-section of a portion of an embodiment of an electric machine 100. As depicted, each rotor shaft 116 is rotatably supported by front plate 134 and back plate 136, with suitable bearings. Rotor shafts 116 may be formed integrally with or otherwise be connected to or coupled to a gear (e.g. outer gear 118 or inner gear 119). Outer gears 118 are configured to engage an outer face of main gear 150. Inner gear 119 is configured to engage an inner face of main gear 150.

Main gear 150 is connected to shaft 104, such that rotation of one or more outer rotors 102 and/or inner rotor 103 causes outer gears 118 and/or inner gear 119 to drive main gear 150, and therefore shaft 104, into rotation—or vice versa, depending upon the mode of operation (motor vs. generator). During a motor mode of operation, outer rotors 102 and inner rotors 103 can be used simultaneously to drive main gear 150. Alternatively, during a generator mode of operation, rotation of main gear 150 can drive outer rotors 102 and inner rotors 103 when generating electricity in windings 108.

In some embodiments, outer rotors 102 and inner rotor 103 are configured to operate in electromagnetically independent triplets 160. That is, the rotors 102, 103 can be separated magnetically into triplets 160, such that there is no provision of magnetic material linking any two triplets 160 of rotors 102, 103 together, and the only linkages between separate triplets 160 are mechanical (e.g. support structure, gears 118, 119 or other mechanical couplings).

In some embodiments, each triplet 160 includes two radially-outer rotors 102 and one radially-inner rotor 103. The outer rotors 102 and inner rotors 103 of a given triplet 160 can benefit from the provision of common magnetic circuit components, such as stators 122 and/or windings 108, as shown, for example, in FIGS. 4 and 5. Such a shared configuration can significantly reduce the amount of magnetic material required for operation of the rotors, with corresponding cost and weight savings. Such arrangement can also promote an efficient use of space and power-density. Relative to other multi-rotor electric machine configurations, the use of both outer and inner rotors 102, 103 with shared magnetic components to engage main gear 150 on both inner and outer faces may increase the power output by as much as 50% without significant addition of weight to machine 100. Thus, the power-to-weight ratio of machine 100 may be substantially increased relative to electric machines which do not incorporate the disclosed configuration of outer rotors 102 combined with an inner rotor 103.

For example, since the magnetic circuit for the two outer rotors 102 and inner rotor 103 in triplet 160 is provided in common (see, e.g., FIG. 5 which illustrates the magnetic flux path within the magnetic circuit for a given triplet 160 of rotors), the source of magnetic energy (winding 108) may also be common to the three rotors in the triplet 160, and as such shared by the three rotors 102a, 102b, 103 in triplet 160. This means that the three rotors 102a, 102b, 103 in a triplet 160 can be energized by a single winding 108, if desired, which results in a substantial weight savings in the weight of the overall machine. Although the figures depict a configuration in which there is one winding 108 per stator 122, it is contemplated that other embodiments may include more than one winding 108 per stator 122 for each triplet 160 of rotors 102, 103.

Figure 4:
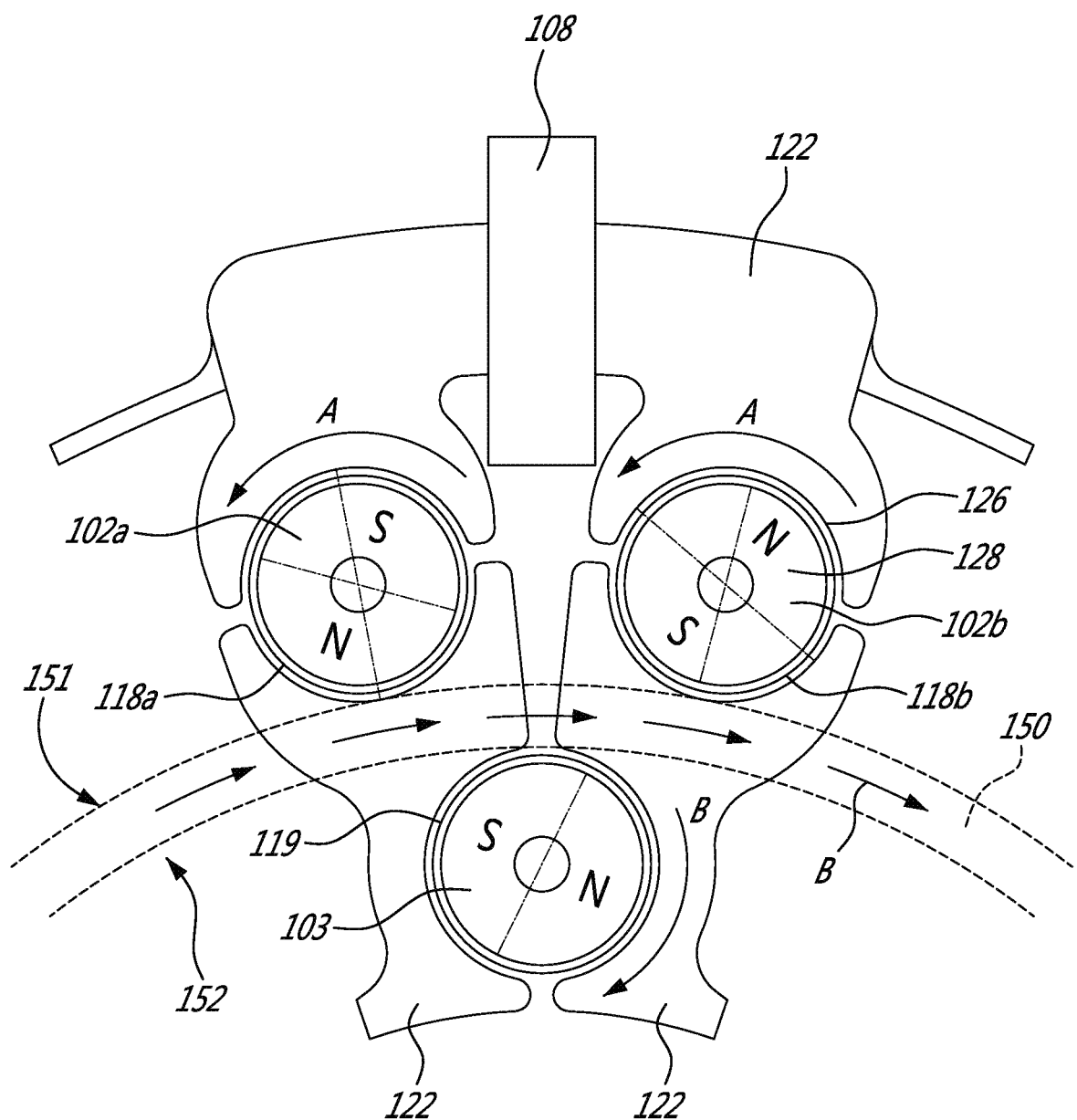
FIG. 4 is a schematic front partial cut-away view of a portion of the electric machine of FIG. 1.

Referring to FIG. 4, each rotor 102a, 102b, 103 comprises one or more magnets 128 mounted on a shaft 116 and retained, particularly when rotating, by a containment sheath 126. Magnets 128 comprise north and south poles (denoted "N" and "S", respectively). In some embodiments, rotors 102, 103 comprise single pairs of north and south poles, and may be referred to as bi-pole rotors 102, 103. Moreover, rotors are provided in triplets 160, each triplet 160 comprising a pair of outer rotors 102 (denoted as first outer rotor 102a and second outer rotor 102b) and an inner rotor 103. The rotors are indexed such that magnets 128 are mounted, and rotate, (a) as individual rotors in a desired phase with respect to their triplet-mates (102a, 102b, 103), and (b) by triplet 160, in a desired triplet phase with respect to other triplets 160a and windings 108a.

When using triplet 160 sets of bi-pole rotors indexed as described herein, particular advantage may be gained by phasing rotors within each triplet 160. Such a configuration may make efficient use of the flux paths 132 (denoted in FIG. 5) around the rotors 102, 103 and therefore provide better efficiency of interactions between rotors 102, 103 and winding 108, resulting in greater power being developed from electric machine 100.

It should be noted that during operation, the direction of rotation of inner rotor 103 is opposite to that of the outer rotors 102a, 102b. This is illustrated In FIG. 4, which shows the first and second outer rotors 102a, 102b rotating in direction A, while inner rotor 103 rotates in direction B (which is the same as the direction of rotation of the main gear 150). Although FIG. 4 shows outer rotors 102a, 102b rotating in a counter-clockwise direction and inner rotor 103 and main gear 150 rotating in a clockwise direction, it should be noted that the converse is also possible (i.e. outer rotors 102a, 102b can rotate clockwise and inner rotor 103 and main gear 150 can rotate counter-clockwise).

It should also be noted that in some embodiments, during operation of machine 100, the speed of rotation of each rotor 102a, 102b, and 103 in each triplet 160 is the same magnitude. That is, rotors 102a and 102b rotate at a given speed in a given direction of rotation, and inner rotor 103 rotates at substantially the same speed as outer rotors 102a, 102b, but in the opposite direction. As noted above, the rotation of rotors 102a, 102b, and 103 causes the rotation of outer gears 118 and inner gear 119, which in turn causes rotation of main gear 150. It is understood that the circumference of the main gear 150 at its outer face 151 is greater than the circumference of the main gear at its inner face 152. As such, the linear (tangential) speed of the outer face 151 will be greater in magnitude than the linear (tangential) speed of the inner face 152 for a given angular velocity. Accordingly, it is understood that radially-outer gears 118, radially-inner gear 119 and faces 151, 152 of main gear 150 may be sized and configured to accommodate the common rotation speed of radially-outer gears 118 and radially-inner gear 119 that are meshed with common main gear 150. For example, the diameter of the inner gear 119 may be selected so as to be shorter than the diameter of the outer gears 118a, 118b in one rotor triplet 160.

It has been found that an increase in magnetic path utility due to such (e.g., triangular) triplet configurations can allow for significant savings in weight and bulk, as compared to electric machines which assign one magnetic circuit to each rotor. For example, the addition of a third rotor (e.g. inner rotor 103) may cause an increase in power output by up to 50% relative to a configuration including only rotor pairs sharing a magnetic circuit without the third rotor. As will be understood by those skilled in the relevant arts, an increase in the diameter of an individual rotor magnet 128, and the corresponding strength of that magnet 128's surface area and the corresponding strength of the magnet's electromagnetic interaction with its corresponding winding 108 can be utilized to increase the power provided by machine 100. However, to optimize the power provided, the cross-section of the corresponding stator 122 may be increased, in order to maintain the desired flux density. By grouping magnets 128 in rotor triplets 160 and employing a shared stator 122, flux density may be maintained with a minimal weight penalty, which may be particularly important in weight-critical applications such as aerospace and transportation activities.

Windings 108 may be provided in any configuration suitable for use in accomplishing the purposes described herein. A wide variety of such configurations are known which may maximize the efficiency of machine 100 for a given application. For example, single Litz or multiple strand windings 108 may be used in configuring either machine 100, individual rotors 102, 103, rotor triplets 160, or other sets of rotors. The use of multiple windings 108 in machine 100 may be employed, for example in conjunction with a suitable mechanical indexing of the rotors 102, 103 to fully or partially provide desired phasings in torque applied by rotors 102, 103 to main gear 150 and shaft 104. In some embodiments, three-phase windings may be employed.

Figure 5:
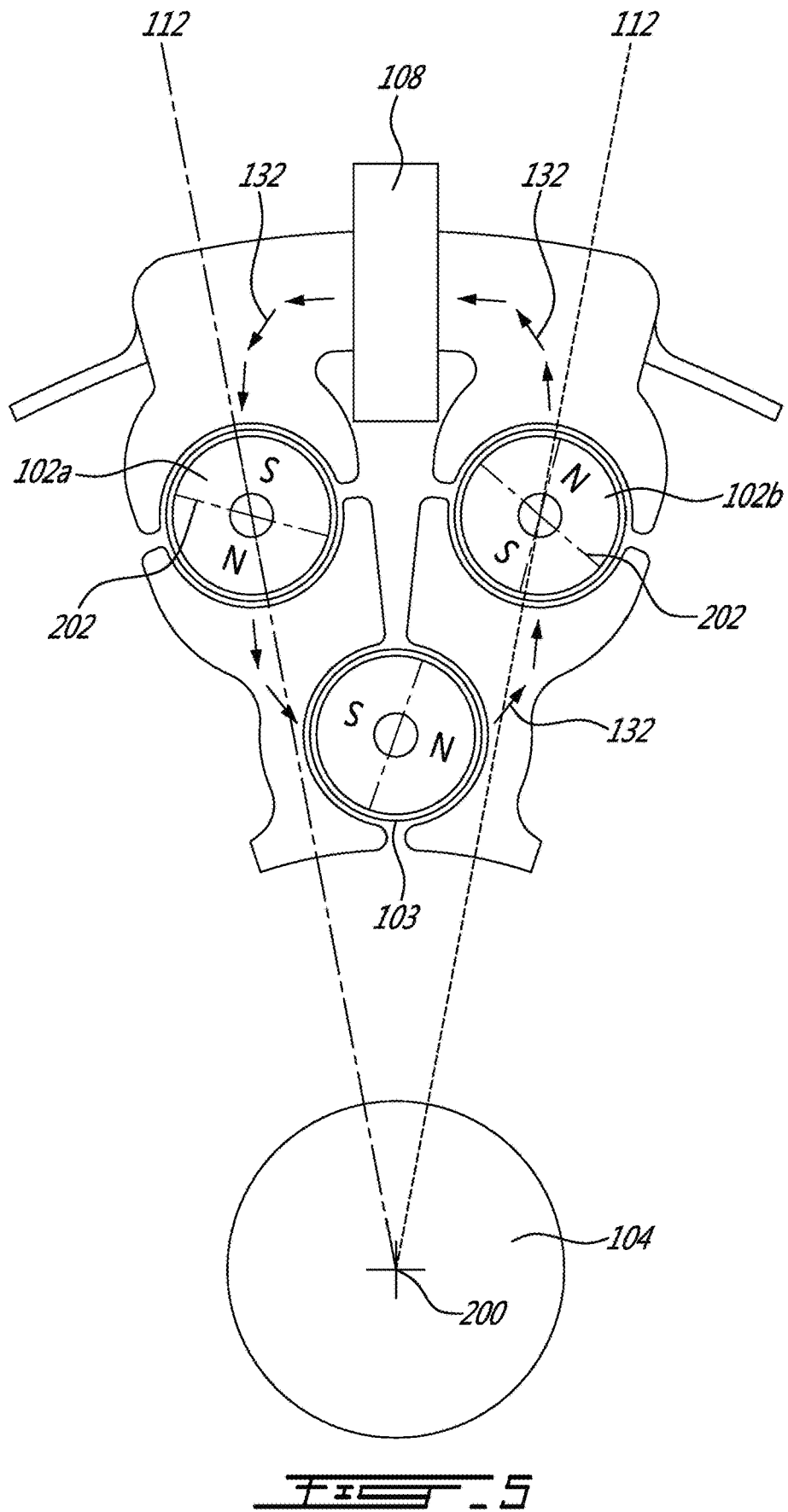
FIG. 5 is a schematic front partial cut-away view of the portion of the electric machine of FIG. 4 showing representations of a magnetic circuit associated with the electric machine.

As depicted in FIG. 5, in some embodiments the machine 100 includes one winding 108 per stator 122. That is, one winding 108 is provided for each triplet 160 of rotors 102a, 102b, 103. The use of a single winding 108 per rotor triplet 160 may provide improved efficiency for the machine 100, as compared to machines in which multiple windings are used.

As noted previously, the efficiency of machine 100 can be increased through the suitable phasing (i.e., indexing) of rotors 102, 103 with respect to each other and with respect to winding 108. In particular, the operation of machine 100 can be controlled by phasing outer rotors 102a, 102b and inner rotor 103 with respect to each other and to winding 108 in triplets. This may be accomplished, for example, by suitable gearing of outer rotors 102a, 102b and inner rotor 103 with respect to each other and to motor shaft 104.

In the example embodiment shown in FIGS. 3 and 4, each gear 118 driven by outer rotors 102 engages the outer face 151 of main gear 150, and each gear 119 driven by inner rotors 103 engages the inner face 152 of main gear 150, so that total torque applied to main gear 150 is the sum of the torques applied by the inner and outer gears 118, 119. If windings 108 are configured substantially circumferentially about axis 200 of shaft 104 and therefore machine 100, an index angle 112 may be defined between equators 202 (a theoretical line dividing a magnet into a north and south half) of individual magnets 128 and radii 204 extending from axis 200 to a corresponding rotor 102, 103. By suitable arrangement of rotors 102, 103 and/or gears 118, 119, index angles 112 may be set at desired values for individual rotors, and triplet sets thereof, with the result that phased torque output applied by each of the rotor triplets 160 can be applied to provide smooth, continuous, and powerful torque to shaft 104 via main gear 150, in the case of motor operation. In the case of generator operation, smooth and continuous current output may be obtained from winding(s) 108 by applying a torque to shaft 104.

FIG. 6 is a schematic front partial cut-away view of a portion of an electric machine showing rotor orientations in accordance with an embodiment. Radius 204a extends from axis 200 through the centre of outer rotor 102a. Radius 204b extends through the centre of outer rotor 102b. Radius 204c extends through the centre of inner rotor 103. As depicted, equator 202a of outer rotor 102a is perpendicular to radius 204a. Equator 202b of outer rotor 102b is perpendicular to radius 204b, with the polarity of the magnet in outer rotor 102b being reversed relative to the magnet in outer rotor 102a. Equator 202c of inner rotor 103 is parallel to radius 204c. It will be appreciated by a person skilled in the art that FIG. 6 is an example depiction of inner rotors 103 and outer rotors 102a, 102b at a moment in time, and that the rotors will be rotating throughout operation. The difference between the index angles of each rotor 102a, 102b, 103 in a triplet may be substantially maintained throughout operation, although there may be variation by several degrees depending on the driving current, the loading on the machine 100, and the phase advance.

FIGS. 7A to 7E are schematic front partial cut-away views of the portion of the electric machine depicted in FIG. 6 throughout a half-cycle of operation (that is, throughout 180 degrees of rotation). FIG. 7A illustrates the same initial configuration as FIG. 6, as well as arrows indicating the outer rotors 102a, 102b moving in direction A, and the inner rotor moving in direction B, and the flux lines associated with the magnetic circuit in stator 122.

FIG. 7B depicts the electric machine of FIG. 7A after 45 degrees of rotation. As can be seen, each of outer rotors 102a, 102b has rotated substantially 45 degrees in direction A (in this example, direction A is counter-clockwise), and inner rotor has rotated substantially 45 degrees in direction B (in this example, direction B is clockwise). The flux path is also depicted.

FIG. 7C depicts the electric machine of FIG. 7A after 90 degrees of rotation relative to the initial configuration in FIG. 7A. As can be seen, each of outer rotors 102a, 102b has rotated substantially 90 degrees in direction A, and inner rotor 103 has rotated substantially 90 degrees in direction B. It can be seen that at this moment in time, the flux path is temporarily broken between the three rotors 102a, 102b, 103.

FIG. 7D depicts the electric machine of FIG. 7A after 135 degrees of rotation relative to the initial configuration in FIG. 7A. As can be seen, each of outer rotors 102a, 102b has rotated substantially 135 degrees in direction A, and inner rotor 102 has rotated substantially 135 degrees in direction B. The flux path is also depicted and once again travels through each of the rotors in the triplet, although the flux now follows a clockwise path relative to the initial counter-clockwise flux path in FIG. 7A.

FIG. 7E depicts the electric machine of FIG. 7A after 180 degrees of rotation relative to the initial configuration of FIG. 7A. As can be seen, each of outer rotors 102a, 102b has rotated substantially 180 degrees, and inner rotor 103 has rotated substantially 180 degrees. As such, each of rotors 102a, 102b and 103 is now in the opposite polarity relative to the initial configuration of FIG. 7A, and the flux path depicted is substantially opposite in direction to the flux path depicted in FIG. 7A.

It will be appreciated that in FIGS. 4 and 5, the inner rotor angle is different than the embodiments shown in FIGS. 6 and 7A-7E. It should be appreciated that the indexing of the inner rotor 103 relative to outer rotors 102a, 102b may be different than what is depicted in FIG. 7 by several degrees, as the configuration may vary depending on whether a machine is optimized for torque, speed, or the like.

In the embodiment shown in FIGS. 1 and 2, an 18-rotor (12 outer, 6 inner), 6-phase system is shown. As will be understood by those skilled in the art, the disclosure is also applicable to a 9-rotor (6 outer, 3 inner), 3-phase system, a 36-rotor (24 outer, 12 inner), 12-phase system, and other combinations.

In the case of the 18-rotor, 6-phase system depicted in FIG. 2, each of the 12 outer rotors and 6 inner rotors may be grouped into six triplets 160, each triplet having 2 outer rotors 102*a*, 102*b*, and one inner rotor 103.

Further, each of the 6 rotor triplets 160*a* may be phased relative to its adjacent two rotor triplets 160*b*, 160*c*. For example, equators 202 of the $1^{st}$ and $4^{th}$ triplets 160*a*, 160*d* may be aligned with their respective radii 204 from axis 200 (though the outer rotors 102*a* and 102*b* may be 180 degrees out of phase with one another), while equators 202 of the $2^{nd}$ and $5^{th}$ triplets 160*b*, 160*e* are indexed by 60 degrees with respect to the $1^{st}$ and $4^{th}$ triplets 160*a*, 160*d*, and equators 202 of $3^{rd}$ and $6^{th}$ triplets 160*c*, 160*f* may be indexed by 60 degrees with respect to $2^{nd}$ and $5^{th}$ triplets 160*b*, 160*e*, and by 120 degrees with respect to $1^{st}$ and $4^{th}$ triplets 160*a*, 160*d*.

In a 9-rotor (6 outer, 3 inner), 3-phase system, each adjacent rotor triplet 160 may be indexed by 120 degrees with respect to its neighbour triplets (this may be implemented as a single channel, 3 phase system). In a 36-rotor (24 outer, 12 inner) system, each adjacent rotor triplet 160 can be indexed by 30 degrees relative to its neighbour triplets (this may be implemented as a dual channel 6-phase system, a 3-channel 4-phase system, or a 4-channel 3-phase system). In an 18-rotor (12 outer, 6 inner) system, each adjacent rotor triplet 160 can be indexed by 60 degrees relative to its neighbour triplets (this may be implemented as a single channel, 6 phase system, or a dual channel, 3-phase system).

As will be readily apparent to those skilled in the relevant arts, a wide variety of combinations and geometries of indexing and phasing may be chosen, depending on the desired input and output characteristics, and geometry, of the machine 100. For example, adjacent rotor triplets 160 can be indexed relative to each other such that when a current is passed through one or more windings magnetically coupled to the respective stators, the rotor triplets 160 provide phased rotary power to the common main gear 150.

As will be further apparent to those skilled in the relevant arts, the desired indexing of adjacent rotor triplets can be accomplished mechanically, electrically, or in any suitable or desired combination thereof.

As previously noted, in various embodiments this disclosure provides electric machines having a plurality of flux paths (i.e., magnetic circuits) defined between triplets of rotors, each triplet of rotors being associated with a shared stator 122. Respective triplets of rotors may further be associated with a single winding 108, shared by the triplet.

Any materials suitable for use in accomplishing the purposes described herein may be used in fabricating the various components of machine 100, including, for example, those used in fabricating analogous components of known electric machines. The selection of suitable materials would be within the knowledge of those skilled in the art.

As has already been noted, machine 100 may be operated as a motor by applying a suitable AC or commutated DC voltage across windings 108, or as a generator by applying mechanical torque to shaft 104 and tapping current from leads suitably connected to windings 108.

Electric machines in accordance with the disclosure can be operated, with appropriate rectifiers, solid state switches, capacitors, and other electronic components, using either direct- or alternating-current input, to provide either direct or alternating-current output, depending upon whether electrical or mechanical input is applied to the windings 108 or shaft 104, respectively.

The above descriptions are meant to be exemplary only, and one skilled in the art will recognize that changes may be made to the embodiments described herein without departing from the scope of the described subject matter. Still other modifications which fall within the scope of the described subject matter will be apparent to those skilled in the art, and such modifications are intended to fall within the scope of the appended claims.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A multi-rotor electric machine comprising:
a stator;
a first rotor magnetically coupled to the stator and rotatably mounted relative to the stator;
a second rotor magnetically coupled to the stator and rotatably mounted relative to the stator, the first and second rotors sharing a common magnetic circuit with the stator; and
a gear drivingly coupled to both the first and second rotors, the first rotor being drivingly coupled to a first face of the gear and the second rotor being drivingly coupled to a second face of the gear.

2. The electric machine of claim 1, wherein the first face of the gear is a radially-outer face, and the second face of the gear is a radially-inner face.

3. The electric machine of claim 1, further comprising a third rotor magnetically coupled to the stator and rotatably mounted relative to the stator, the third rotor being drivingly coupled to the gear.

4. The electric machine of claim 3, wherein the first, second and third rotors are magnetically indexed in a triplet sharing the common magnetic circuit.

5. The electric machine of claim 3, wherein the third rotor is drivingly coupled to the first face of the gear.

6. The electric machine of claim 5, comprising a plurality of triplets of first, second and third rotors, the first face of the gear is a radially-outer face, and the second face of the gear is a radially-inner face.

7. The electric machine of claim 1, wherein the first and second rotors are configured to rotate in opposite directions.

8. The electric machine of claim 1, wherein the first and second rotors are energized by a single winding.

9. A method of operating an electric machine having a stator, a first rotor magnetically coupled to the stator and a second rotor magnetically coupled to the stator, the method comprising:
driving the first and second rotors via a common magnetic circuit shared with the stator;
driving a gear via a first face of the gear using the first rotor; and
while the gear is driven using the first rotor, driving the gear via a second face of the gear using the second rotor.

10. The method of claim 9, wherein the first face is a radially-outer face of the gear and the second face is a radially-inner face of the gear.

11. The method of claim 9, wherein the first rotor and the second rotor rotate in opposite directions.

12. The method of claim 9, wherein the first rotor and the second rotor operate at substantially a same rotational speed.

13. The method of claim 10, comprising driving the gear via the radially-outer face of the gear using a third rotor while the gear is driven using the first and second rotors, the third rotor being magnetically coupled to the stator.

14. The method of claim 13, wherein:
the first and third rotors rotate in a first direction; and
the second rotor rotates in a second direction opposite the first direction.

* * * * *